(12) United States Patent
Heiden et al.

(10) Patent No.: US 12,086,902 B2
(45) Date of Patent: Sep. 10, 2024

(54) GENERATING A TOP VIEW OF A MOTOR VEHICLE

(71) Applicant: Bayerische Motoren Werke Aktiengesellschaft, Munich (DE)

(72) Inventors: Tessa Heiden, Munich (DE); Christian Weiss, Hohenwarth (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 127 days.

(21) Appl. No.: 17/794,004

(22) PCT Filed: Nov. 23, 2020

(86) PCT No.: PCT/EP2020/083051
§ 371 (c)(1),
(2) Date: Jul. 20, 2022

(87) PCT Pub. No.: WO2021/148164
PCT Pub. Date: Jul. 29, 2021

(65) Prior Publication Data
US 2023/0050917 A1 Feb. 16, 2023

(30) Foreign Application Priority Data
Jan. 24, 2020 (DE) .................. 10 2020 101 637.9

(51) Int. Cl.
*G06T 11/00* (2006.01)
*G06V 10/82* (2022.01)
*G06V 20/56* (2022.01)

(52) U.S. Cl.
CPC .............. *G06T 11/00* (2013.01); *G06V 10/82* (2022.01); *G06V 20/56* (2022.01)

(58) Field of Classification Search
None
See application file for complete search history.

(56) References Cited

U.S. PATENT DOCUMENTS

| 2011/0285848 | A1* | 11/2011 | Han | B60R 1/00 |
| | | | | 348/148 |
| 2019/0094875 | A1 | 3/2019 | Schulter et al. | |
| 2022/0156985 | A1* | 5/2022 | Koguchi | G08G 1/16 |

OTHER PUBLICATIONS

International Search Report (PCT/ISA/210) issued in PCT Application No. PCT/EP2020/083051 dated Feb. 15, 2021 with English translation (seven (7) pages).
German-language Written Opinion (PCT/ISA/237) issued in PCT Application No. PCT/EP2020/083051 dated Feb. 15, 2021 (nine (9) pages).
German-language Search Report issued in German Application No. 10 2020 101 637.9 dated Oct. 15, 2020 with partial English translation (14 pages).
Zhu et al., "Generative Adversarial Frontal View to Bird View Synthesis," 2018 International Conference on 3D Vision (3DV) IEEE, Sep. 5, 2018, pp. 454-463, XP033420123 (10 pages).

(Continued)

*Primary Examiner* — Yingchun He
(74) *Attorney, Agent, or Firm* — Crowell & Moring LLP (57) ABSTRACT

A device generates a first top view of a motor vehicle depending on a first view-related information from at least one image of at least one camera whose optical axis is substantially parallel to a plane spanned by the vehicle longitudinal direction and the vehicle lateral direction.

9 Claims, 2 Drawing Sheets

(56) References Cited

OTHER PUBLICATIONS

Hoang et al., "MGAN: Training Generative Adversarial Nets with Multiple Generators," Oct. 27, 2017, pp. 1-24, XP055605228, Retrieved from the Internet: http://openreview.net/pdf?id=rkmu5b01- (24 pages).
Nguyen et al., "Dual Discriminator Generative Adversarial Nets," ARXIV.org, Cornell University Library, 201 Olin Library Cornell University Ithaca, NY 14853, Sep. 12, 2017, pp. 1-11, XP080820432 (11 pages).
Bruls et al., The Right (Angled) Perspective: Improving the Understanding of Road Scenes Using Boosted Inverse Perspective Mapping, 2019 IEEE Intelligent Vehicles Symposium (IV), 2019, pp. 302-309, URL:http://www.robots.ox.ac.uk/-mobile/Papers/2019IV_bruls.pdf.pdf (8 pages).
Generative Adversarial Networks: "The Generator" Google Developers, 2020, URL:https://developers.google.com/machine-learning/gan/generator archiviert am Jan. 11, 2020 durch URL:http://web.archive.org/web/20200111105720if_/https://developers.google.com/machine-learning/gan/generator (3 pages).

\* cited by examiner

GENERATING A TOP VIEW OF A MOTOR VEHICLE

BACKGROUND AND SUMMARY

The invention relates to a device for generating a top view of a motor vehicle and to a method for training this device.

A top view of a motor vehicle may for example be generated by way of one or more cameras that are installed on the bottom of the exterior mirrors. Such systems are already available on the market, for example under the name BMW Top View.

One disadvantage of the known method for generating a top view of a motor vehicle is for example that the image region of the top view is predefined and limited by the position of the one or more cameras. The appropriate cameras are also absolutely necessary for this purpose.

The object of the invention is to provide a device for generating a top view of a motor vehicle and a method for training this device, said device and method overcoming the stated disadvantages.

The object is achieved by the features of the independent patent claims. Advantageous embodiments are described in the dependent claims. It is pointed out that additional features of a patent claim dependent on an independent patent claim, without the features of the independent patent claim or in combination only with a subset of the features of the independent patent claim, may form a standalone invention independent of the combination of all of the features of the independent patent claim that may be made into the subject matter of a dependent claim, a divisional application or a subsequent application. This applies in the same way to technical teaching described in the description, which may form an invention independent of the features of the independent patent claims.

A first aspect of the invention relates to a device for generating a first top view of a motor vehicle, dependent on first view information, from at least one image from at least one camera the optical axis of which is substantially parallel to a plane that is spanned by the vehicle longitudinal direction and the vehicle transverse direction.

The first view information is in particular information that describes the orientation of the optical axis of a possibly virtual camera, or view in relation to a reference system. By way of example, the first view information is information that describes the orientation of the optical axis of the top view to be generated in relation to a plane that is spanned by the vehicle longitudinal direction and the vehicle transverse direction.

The top view is a view from above the optical axis of which is substantially orthogonal to a plane that is spanned by the vehicle longitudinal direction and the vehicle transverse direction.

The first view information is thus for example information that characterizes a view the optical axis of which is substantially orthogonal to a plane that is spanned by the vehicle longitudinal direction and the vehicle transverse direction, in which the angle arising between the optical axis and the plane is between 80° and 100°, for example when it is 90°.

The optical axis of the camera is in particular substantially parallel to the plane that is spanned by the vehicle longitudinal direction and the vehicle transverse direction when the angle arising between the optical axis and the plane is <10°, for example when it is 0°.

The device is designed to receive the at least one image from the camera.

The device is furthermore designed to extract second view information from the image by way of a coding unit. The second view information is in particular information that describes the orientation of the optical axis of the camera in relation to the plane that is spanned by the vehicle longitudinal direction and the vehicle transverse direction.

The device is furthermore designed to extract view-independent content information from the image by way of the coding unit, and to generate the first top view on the basis of the first view information and the view-independent content information by way of a first generator unit.

The core concept of the invention here is that of representing the view-independent content information from the perspective of the first view information.

In one advantageous embodiment of the invention, the device additionally comprises a first discriminator unit that is designed to receive the top view generated by the first generator unit, a second generator unit that is designed to generate a second top view from third view information and noise information, and a second discriminator unit that is designed to receive the top view generated by the second generator unit.

The first discriminator unit and the second discriminator unit are in particular each designed to decide whether the first top view or the second top view have been generated by the first generator unit or second generator unit, respectively, or whether the first top view or the second top view have been generated by a camera the optical axis of which is substantially orthogonal to a plane that is spanned by the vehicle longitudinal direction and the vehicle transverse direction.

The optical axis of this camera is in particular substantially orthogonal to the plane that is spanned by the vehicle longitudinal direction and the vehicle transverse direction when the angle arising between the optical axis and the plane is between 80° and 100°, for example when it is 90°.

The core concept of the invention here is that the two discriminator units are designed to distinguish between a "real" camera image and an artificially generated camera image. For the methods for training the device that are described later, this thus results in the effect whereby the top views generated by the two generator units have a high quality and are ideally no longer able to be distinguished from real camera images.

In a further advantageous embodiment, the first generator unit, the second generator unit, the first discriminator unit and the second discriminator unit each comprise a neural network.

A neural network is a collection of individual information processing units (neurons) that are arranged in layers in a network architecture. Reference is also made to artificial neural networks in connection with artificial intelligence.

The neurons (also node points) of an artificial neural network are arranged in what are known as layers and are generally connected to one another in a fixed hierarchy. The neurons are in this case usually connected between two layers (inter-neuron layer connection), but in rarer cases are also connected within one layer (intra-neuron layer connection).

Beginning with the input layer, information flows via one or more intermediate layers (or hidden layers) to the output layer. The output of one neuron is in this case the input of the next one.

The input layer is the starting point of the flow of information in an artificial neural network.

Input signals are usually received by the neurons at the start of this layer and forwarded at the end in weighted form to the neurons of the first intermediate layer. In this case, a neuron of the input layer forwards the respective information to the neurons of the first intermediate layer.

At least one intermediate layer (also activity layer or hidden layer) is located between the input layer and the output layer in any artificial neural network. The more intermediate layers there are, the "deeper" the neural network is, and reference is then also made in such cases to deep learning.

The number of possible hidden layers in an artificial neural network is unlimited in theory. In practice, however, any hidden layer that is added also brings about an increase in the required computing power needed for the operation of the network.

The output layer is located downstream of the intermediate layers and forms the last layer in an artificial neural network. Neurons arranged in the output layer are each connected to the neurons of the last intermediate layer. The output layer constitutes the end point of the flow of information in an artificial neural network and contains the result of the information processing performed by the network.

Weights describe the intensity of the flow of information along a connection in a neural network. Each neuron for this purpose allocates a weight for the flowing information and then forwards this in weighted form, and possibly following addition of a value for the neuron-specific bias, to the neurons of the next layer. The weights and biases are usually initialized at the beginning of training. The result of the weighting and biasing is often routed through what is known as an activation function (for example sigmoid or tanh) before it is forwarded to the neurons of the next layer.

The weights and biases are adapted during the training process such that the end result corresponds to the requirements as precisely as possible.

The neural network of the first generator unit and the neural network of the second generator unit each at least partially have the same edge weights, and the neural network of the first discriminator unit and the neural network of the second discriminator unit each at least partially have the same edge weights.

The neural network of the first generator unit and the neural network of the second generator unit, or the neural network of the first discriminator unit and the neural network of the second discriminator unit, in particular have at least partially identical edge weights at points of the neural network that correspond to one another, that is to say points that for example have the same structure and/or the nodes of which correspond to one another semantically.

The edge weights of the neural networks are in particular at least partially identical when at least 90% of the edge weights are identical or particularly preferably 100% of the edge weights are identical.

A second aspect of the invention relates to a method for training the device.

One step of the method is that of providing a training data pair, consisting of a training image and a first training top view. The training data pair is in this case selected such that the first training top view arises, taking into consideration the relevant view information from the training image.

A further step of the method is that of extracting the second view information from the training image by way of the coding unit, and extracting the view-independent content information from the training image by way of the coding unit.

A further step of the method is that of generating the first top view on the basis of the first view information and the view-independent content information by way of the first generator unit.

A further step of the method is that of deciding, by way of the first discriminator unit, whether the first top view has been generated by the first generator unit, or whether the first top view has been generated by a camera the optical axis of which is substantially orthogonal to a plane that is spanned by the vehicle longitudinal direction and the vehicle transverse direction.

A further step of the method is that of comparing the first top view with the first training top view, and adapting the coding unit and/or the first generator unit and/or the first discriminator unit on the basis of the comparison of the first top view with the first training top view.

The coding unit and the first generator unit are in particular adapted so as to increase the probability of the first discriminator unit classifying the first top view as an image from a camera the optical axis of which is substantially orthogonal to a plane that is spanned by the vehicle longitudinal direction and the vehicle transverse direction.

As an alternative or in addition, the discriminator unit is adapted so as to increase the probability of the first discriminator unit recognizing the first top view as an image generated by the first generator unit.

The core concept of the invention here is that the first discriminator unit, on the one hand, and the first generator unit and the coding unit, on the other hand, are trained simultaneously in terms of achieving competing goals. This leads to the quality of the first top view generated by the first generator unit increasing and this becoming increasingly difficult to distinguish from an actual camera image.

In one advantageous embodiment, the method comprises the step of adapting at least two of the following units on the basis of the comparison of the first top view with the first training top view: coding unit, first generator unit, first discriminator unit.

Adapting the coding unit, the first generator unit and/or the first discriminator unit means, in the event that these units each comprise a neural network, adapting the edge weights of the neural networks.

Adapting the edge weights causes the neural network to "learn".

The learning may for example work as follows: After the network structure has been constructed, each neuron receives a random starting weight. The input data are then entered into the network, and each neuron weights the input signals with its weight and forwards the result to the neurons of the next layer. The overall result is then computed at the output layer—and this will generally have little to do with the known actual result, since all the neurons actually have a random starting weight. However, it is possible to compute the size of the error and the contribution that each neuron made to this error, and then to change the weight of each neuron a small amount in the direction that minimizes the error. This is followed by the next pass, another measurement of the error and an adaptation of the weights, and so on. A neural network thus "learns" increasingly better to conclude as to the known output data from the input data.

In detail, the input data are fed in on one side of the neural network. In this case, each input signal is distributed to each individual neuron of the first layer. Each neuron then weights the incoming signal with an input-specific weight (that has been randomly allocated at the beginning), adds what is known as a neuron-specific bias term and sums all of the input data weighted in this way to form the output of this one neuron.

The output is in this case often also routed through a non-linear activation function, in order for example to force a particular value range of the output. The output of each neuron is then forwarded as input to all neurons of the following layer. This process continues until reaching the output layer that delivers the result of all computations.

Up to this point, the artificial neural network has not yet learned anything. Since all of the weightings are selected randomly within a predefined value range when a neural network is initialized, the result will be a purely random value. The variant most used at present to train a network is what is known as supervised learning, i.e. learning on the basis of examples.

An example in this case means a combination of real input/output data pairs. These examples are used in the course of training artificial neural networks in order to set all weights and bias terms in an optimum manner, such that the network is able to compute the correct result for all input data and also for as yet unseen new input data at the end of training.

In this case, the as yet untrained neural network calculates a respective result for a set of input data (also called features). This result is then compared with the known results of the example dataset (also called targets or labels), and the size of the deviation or the error is computed. In order to be able to simultaneously depict both positive and negative deviations, use is made for example of the average of the squared deviation or another error function.

The actual "learning" then begins: The measured error is backpropagated into the artificial neural network, and each weight and each bias term is adapted a small amount in the direction that makes the error smaller. The size of this adaptation is computed firstly using the contribution that a particular neuron weight made to the result, and secondly using what is known as the learning rate, which is one of the most important setting variables of neural networks.

Common learning rates are for example 0.001 or 0.01, that is to say only one hundredth to one thousandth of the calculated error is corrected per pass. If the adaptation per pass is too great, it may be the case that the minimum of the error curve is distorted and the deviations become increasingly large instead of smaller. The learning rate is therefore sometimes made increasingly small during training in order to better determine the minimum of the error function.

Another possible problem are error functions with local minima in which the neural network remains "stuck" and therefore does not find the actual minimum. The direction of the correction is calculated by deriving the respective functions, the negative value of which specifies the direction in which the error function is minimized. Minimizing the selected error function is the goal of training or learning.

After all of the weights have been adapted, there is another pass of all of the input data and another measurement of the error and this error is backpropagated in order to adapt the weights again. A complete pass of all of the input data is in this case respectively referred to as an epoch. The number of training epochs is likewise an important hyperparameter for training neural networks. In this case, the input data may also be classified into groups of equal size depending on the size of the dataset, and the training may in each case be performed batchwise.

This may for example be expedient in order to train an artificial neural network more quickly or to comply with limitations of the computing capacity of the executing computer. When dividing into batches, a normal distribution of the values within each batch in comparison with the entire dataset is important. When all of the batches have run through the neural network once, an epoch is complete.

The more examples an artificial neural network receives for training and the more often it has seen these, the smaller the error in the results becomes. The error curve moving towards and touching the 100% line is in this case referred to as convergence, and the profile of the error curve is observed during training in order to potentially stop the training and to be able to make adjustments to the hyperparameters. However, a small error does not always mean a good general performance of the neural network.

This is because, when it has seen all known data very often during training, it may be the case that the artificial neural network learns these data more by heart rather than learning an abstract concept. This problem is also referred to as overfitting. Since neural networks may also replicate highly complex functions, there is the risk that they at some point found the perfect function for each known data point, but this function does not work well for new data.

In order to ensure that a neural network is able to abstract from known example data and also deliver correct results for as yet unlearned input data, the example data are classified prior to training into training data, test data and blind test data, for example at a ratio of 70/20/10.

Only the training data are then used during training, and the error rate is measured respectively both for the training data and for the test data. The measured error in the test data is however not fed back into the artificial neural network. The neural network is then improved through adaptation of all variables so as to achieve maximum performance in relation to training and test data. This "tuning" of neural networks forms part of the core activities of artificial intelligence engineers.

Only when the network has presumably been fully trained are the blind test data used. If the artificial neural network also performs well in the blind test, there is a high probability that it has learned an abstract concept well.

A large amount of example data is accordingly required for the described supervised learning. A large amount means here for example one million examples. Although some artificial neural networks already achieve remarkable results with smaller datasets, the more data available, the better. For the classification of images, for example, usable results are achieved starting from around 1000 example images per class. A whole research branch of artificial intelligence also deals with what are known as one-shot learning methods, that is to say learning based on very few or just one example.

The supervised learning itself may also be further classified into different data usage and forwarding methods within artificial neural networks: In what are known as recurring neural networks, for example, the result of the previous input data is incorporated into the computing of the current output, such that for example time sequences and texts are able to be analyzed and processed, including for example in the case of long short-term memory (LSTM) networks and sequence to sequence networks that are used for example for voice recognition and to translate texts. What are known as convolutional neural networks (CNN) are used for image processing, these sampling images with a matrix and performing further abstraction from deeper layers (points, lines, etc.) in each layer to form higher concepts (a face, a house, etc.).

A third aspect of the invention is a method for training the device.

One step of the method is that of providing a training data pair consisting of training view information and a second training top view.

A further step of the method is that of generating the second top view on the basis of the training view information and the noise information by way of the second generator unit.

In comparison with the training method according to the second aspect of the invention, the training method according to the third aspect of the invention has the advantage that what is known as overfitting of the generator and discriminator units to the training data is prevented, since in this case the generator and discriminator units have to deal with input information that is unexpected because it is randomly generated.

A further step of the method is that of deciding, by way of the second discriminator unit, whether the second top view has been generated by the second generator unit or whether the second top view has been generated by a camera the optical axis of which is substantially orthogonal to a plane that is spanned by the vehicle longitudinal direction and the vehicle transverse direction.

A further step of the method is that of comparing the second top view with the second training top view and adapting the second generator unit and/or the second discriminator unit on the basis of the comparison of the second top view with the training top view.

The second generator unit is in particular adapted so as to increase the probability of the second discriminator unit classifying the second top view as an image from a camera the optical axis of which is substantially orthogonal to a plane that is spanned by the vehicle longitudinal direction and the vehicle transverse direction.

As an alternative or in addition, the second discriminator unit is adapted so as to increase the probability of the second discriminator unit recognizing the second top view as an image generated by the second generator unit.

The method in particular comprises the step of adapting the second generator unit and the second discriminator unit on the basis of the comparison of the second top view with the training top view.

Adapting the second generator unit and/or the second discriminator unit means, in the event that these units each comprise a neural network, adapting the edge weights of the neural networks.

A fourth aspect of the invention relates to a method for training the device.

One step of the method is that of training the device by carrying out the method according to the second aspect of the invention at least once.

A further step of the method is that of training the device by carrying out the method according to the third aspect of the invention at least once.

In this case, the step of training the device by carrying out the method according to the third aspect of the invention at least once is in particular performed only after the step of training the device by carrying out the method according to the second aspect of the invention at least once.

The invention is described below on the basis of an exemplary embodiment with reference to the accompanying drawings.

DETAILED DESCRIPTION OF THE DRAWINGS

Figure 1:
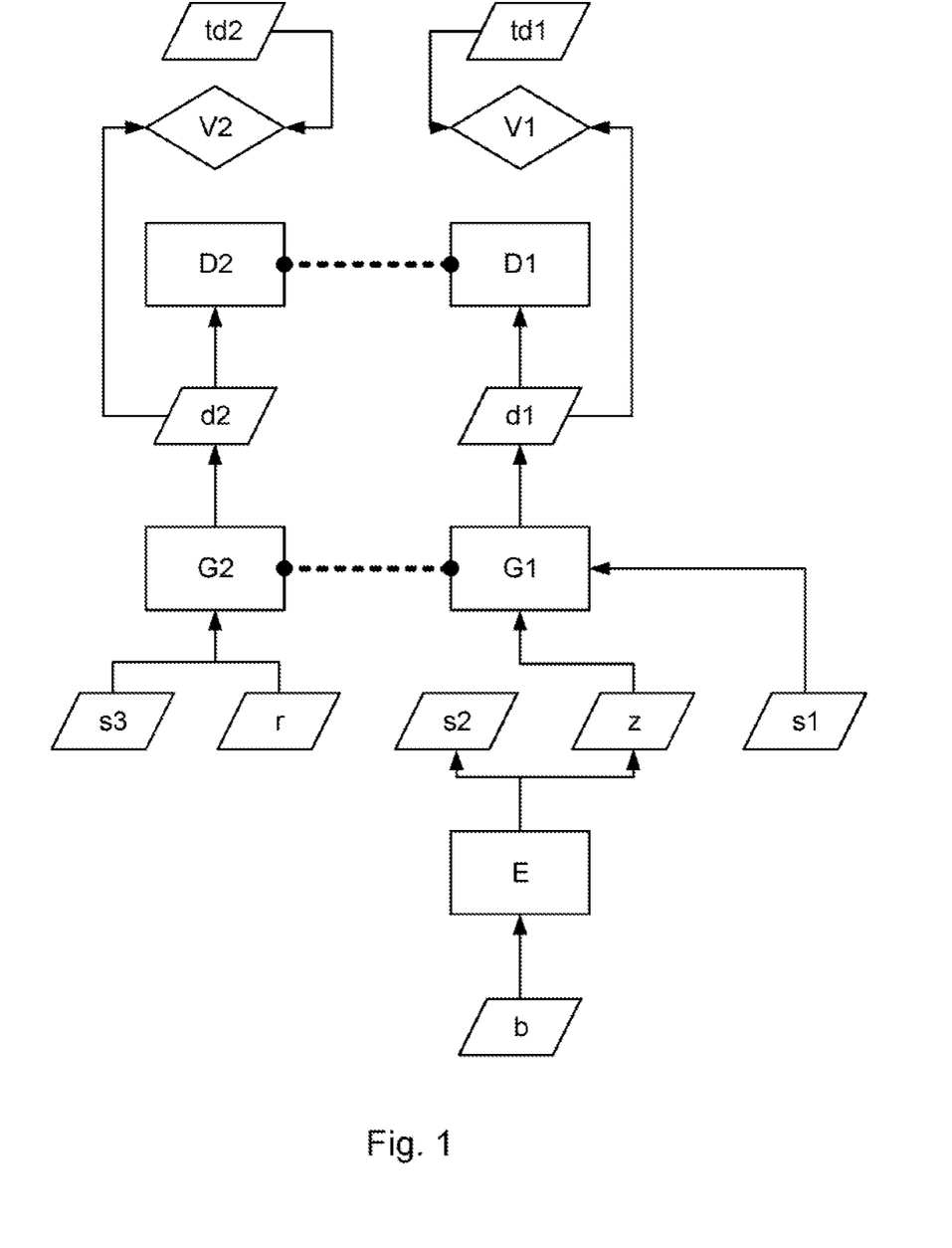
FIG. 1 shows one exemplary embodiment of the device according to the invention.

FIG. 1 shows a device for generating a first top view d1 of a motor vehicle, dependent on first view information s1, from at least one image b from at least one camera k1, k2, k3, k4 the optical axis of which is substantially parallel to a plane that is spanned by the vehicle longitudinal direction and the vehicle transverse direction.

The device is in this case designed to receive the at least one image b from the camera k1, k2, k3, k4, to extract second view information s2 from the image b by way of a coding unit E, and to extract view-independent content information z from the image b by way of the coding unit E.

The device is furthermore designed to generate the first top view d1 on the basis of the first view information s1 and the view-independent content information z by way of a first generator unit G1.

The device furthermore comprises a first discriminator unit D1 that is designed to receive the top view d1 generated by the first generator unit G1, a second generator unit G2 that is designed to generate a second top view d2 from third view information s3 and noise information r, and a second discriminator unit D2 that is designed to receive the top view d2 generated by the second generator unit G2.

The first discriminator unit D1 and the second discriminator unit D2 are each designed to decide whether the first top view d1 or the second top view d2 have been generated by the first generator unit G1 or the second generator unit G2, respectively, or whether the first top view d1 or the second top view d2 have been generated by a camera the optical axis of which is substantially orthogonal to a plane that is spanned by the vehicle longitudinal direction and the vehicle transverse direction.

The first generator unit G1, the second generator unit G2, the first discriminator unit D1 and the second discriminator unit D2 each comprise a neural network.

The neural network of the first generator unit G1 and the neural network of the second generator unit G2 each at least partially have the same edge weights, and the neural network of the first discriminator unit D1 and the neural network of the second discriminator unit D2 likewise each at least partially have the same edge weights.

This device is able to be trained using the methods according to the second, third and fourth aspect of the invention.

The method according to the second aspect of the invention comprises in particular the following steps:
providing a training data pair, consisting of a training image b and a first training top view td1,
extracting the second view information s2 from the training image b by way of the coding unit E,
extracting the view-independent content information z from the training image b by way of the coding unit E,
generating the first top view d1 on the basis of the first view information s1 and the view-independent content information z by way of the first generator unit G1,
deciding, by way of the first discriminator unit D1, whether the first top view d1 has been generated by the first generator unit G1, or whether the first top view d1 has been generated by a camera the optical axis of which is substantially orthogonal to a plane that is spanned by the vehicle longitudinal direction and the vehicle transverse direction, comparing V1 the first top view d1 with the first training top view td1, and adapting the coding unit E and the first generator unit G1 and the first discriminator unit D1 on the basis of the comparison of the first top view d1 with the first training top view td1.

The method according to the third aspect of the invention comprises in particular the following steps:

providing a training data pair consisting of training view information s3 and a second training top view td2, generating the second top view d2 on the basis of the training view information s3 and the noise information r by way of the second generator unit G2, deciding, by way of the second discriminator unit D2, whether the second top view d2 has been generated by the second generator unit G2 or whether the second top view d2 has been generated by a camera the optical axis of which is substantially orthogonal to a plane that is spanned by the vehicle longitudinal direction and the vehicle transverse direction, comparing V2 the second top view d2 with the second training top view td2, and adapting the second generator unit G2 and the second discriminator unit D2 on the basis of the comparison of the second top view d2 with the training top view td2.

Additionally, Applicant also notes that paragraphs 0109 to 0216 of the Published Specification appear to be the original translated application prior to the specification amendments filed in the preliminary amendment (which were indicated in the marked up and clean copies of the specification) filed with the application. The paragraphs 109 to 216 of the Published Specification, which are largely duplicative of paragraphs 0001-0108 (except for the edits included in the preliminary amendment), should be removed from the final issued patent.

The method for training the device according to the fourth aspect of the invention advantageously links the two training methods according to the second aspect of the invention and the third aspect of the invention.

This effect in particular results from the fact that the first generator unit G1 and the second generator unit G2, and also the first discriminator unit D1 and the second discriminator unit D2, are connected to one another by sharing common edge weights.

In one preferred embodiment, the training method according to the second aspect of the invention is in this case first carried out to a greater extent, before the training method according to the third aspect of the invention is carried out to a greater extent at a later time.

Figure 2:
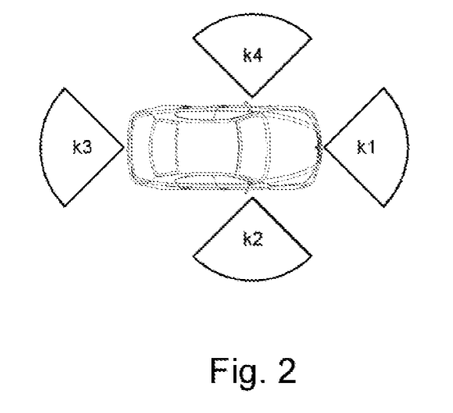
FIG. 2 shows one exemplary embodiment of a motor vehicle having multiple cameras.

FIG. 2 shows one exemplary embodiment of a motor vehicle having multiple cameras k1, k2, k3, k4 that are each arranged on the motor vehicle such that their optical axes are substantially parallel to a plane that is spanned by the vehicle longitudinal direction and the vehicle transverse direction.

Figure 3:
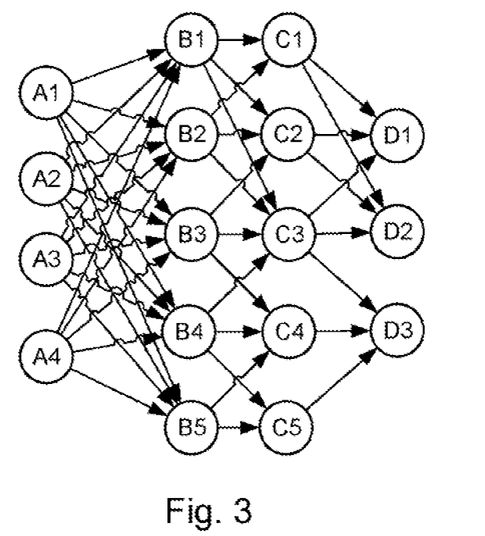
FIG. 3 shows one exemplary embodiment of a neural network.

FIG. 3 shows one exemplary embodiment of a neural network that is constructed from four layers A, B, C, D of neurons A1-A4, B1-B5, C1-C5, D1-D3.

Some of the neurons are connected to one another by edges. As already explained, each of these edges is assigned an edge weight, not illustrated in FIG. 3.

Generating a Top View of a Motor Vehicle

The invention relates to a device for generating a top view of a motor vehicle and to a method for training this device.

A top view of a motor vehicle may for example be generated by way of one or more cameras that are installed on the bottom of the exterior mirrors. Such systems are already available on the market, for example under the name BMW Top View.

One disadvantage of the known method for generating a top view of a motor vehicle is for example that the image region of the top view is predefined and limited by the position of the one or more cameras. The appropriate cameras are also absolutely necessary for this purpose.

The object of the invention is to specify a device for generating a top view of a motor vehicle and a method for training this device, said device and method overcoming the stated disadvantages.

The object is achieved by the features of the independent patent claims. Advantageous embodiments are described in the dependent claims. It is pointed out that additional features of a patent claim dependent on an independent patent claim, without the features of the independent patent claim or in combination only with a subset of the features of the independent patent claim, may form a standalone invention independent of the combination of all of the features of the independent patent claim that may be made into the subject matter of a dependent claim, a divisional application or a subsequent application. This applies in the same way to technical teaching described in the description, which may form an invention independent of the features of the independent patent claims.

A first aspect of the invention relates to a device for generating a first top view of a motor vehicle, dependent on first view information, from at least one image from at least one camera the optical axis of which is substantially parallel to a plane that is spanned by the vehicle longitudinal direction and the vehicle transverse direction.

The first view information is in particular information that describes the orientation of the optical axis of a possibly virtual camera, or view in relation to a reference system. By way of example, the first view information is information that describes the orientation of the optical axis of the top view to be generated in relation to a plane that is spanned by the vehicle longitudinal direction and the vehicle transverse direction.

The top view is a view from above the optical axis of which is substantially orthogonal to a plane that is spanned by the vehicle longitudinal direction and the vehicle transverse direction.

The first view information is thus for example information that characterizes a view the optical axis of which is substantially orthogonal to a plane that is spanned by the vehicle longitudinal direction and the vehicle transverse direction, in which the angle arising between the optical axis and the plane is between 80° and 100°, for example when it is 90°.

The optical axis of the camera is in particular substantially parallel to the plane that is spanned by the vehicle longitudinal direction and the vehicle transverse direction when the angle arising between the optical axis and the plane is <10°, for example when it is 0°.

The device is designed to receive the at least one image from the camera.

The device is furthermore designed to extract second view information from the image by way of a coding unit. The second view information is in particular information that describes the orientation of the optical axis of the camera in relation to the plane that is spanned by the vehicle longitudinal direction and the vehicle transverse direction.

The device is furthermore designed to extract view-independent content information from the image by way of the coding unit, and to generate the first top view on the basis of the first view information and the view-independent content information by way of a first generator unit.

The core concept of the invention here is that of representing the view-independent content information from the perspective of the first view information.

In one advantageous embodiment of the invention, the device additionally comprises a first discriminator unit that is designed to receive the top view generated by the first generator unit, a second generator unit that is designed to generate a second top view from third view information and noise information, and a second discriminator unit that is designed to receive the top view generated by the second generator unit.

The first discriminator unit and the second discriminator unit are in particular each designed to decide whether the first top view or the second top view have been generated by the first generator unit or second generator unit, respectively, or whether the first top view or the second top view have been generated by a camera the optical axis of which is substantially orthogonal to a plane that is spanned by the vehicle longitudinal direction and the vehicle transverse direction.

The optical axis of this camera is in particular substantially orthogonal to the plane that is spanned by the vehicle longitudinal direction and the vehicle transverse direction when the angle arising between the optical axis and the plane is between 80° and 100°, for example when it is 90°.

The core concept of the invention here is that the two discriminator units are designed to distinguish between a "real" camera image and an artificially generated camera image. For the methods for training the device that are described later, this thus results in the effect whereby the top views generated by the two generator units have a high quality and are ideally no longer able to be distinguished from real camera images.

In a further advantageous embodiment, the first generator unit, the second generator unit, the first discriminator unit and the second discriminator unit each comprise a neural network.

A neural network is a collection of individual information processing units (neurons) that are arranged in layers in a network architecture. Reference is also made to artificial neural networks in connection with artificial intelligence.

The neurons (also node points) of an artificial neural network are arranged in what are known as layers and are generally connected to one another in a fixed hierarchy. The neurons are in this case usually connected between two layers (inter-neuron layer connection), but in rarer cases are also connected within one layer (intra-neuron layer connection).

Beginning with the input layer, information flows via one or more intermediate layers (or hidden layers) to the output layer. The output of one neuron is in this case the input of the next one.

The input layer is the starting point of the flow of information in an artificial neural network.

Input signals are usually received by the neurons at the start of this layer and forwarded at the end in weighted form to the neurons of the first intermediate layer. In this case, a neuron of the input layer forwards the respective information to the neurons of the first intermediate layer.

At least one intermediate layer (also activity layer or hidden layer) is located between the input layer and the output layer in any artificial neural network. The more intermediate layers there are, the "deeper" the neural network is, and reference is then also made in such cases to deep learning.

The number of possible hidden layers in an artificial neural network is unlimited in theory. In practice, however, any hidden layer that is added also brings about an increase in the required computing power needed for the operation of the network.

The output layer is located downstream of the intermediate layers and forms the last layer in an artificial neural network. Neurons arranged in the output layer are each connected to the neurons of the last intermediate layer. The output layer constitutes the end point of the flow of information in an artificial neural network and contains the result of the information processing performed by the network.

Weights describe the intensity of the flow of information along a connection in a neural network. Each neuron for this purpose allocates a weight for the flowing information and then forwards this in weighted form, and possibly following addition of a value for the neuron-specific bias, to the neurons of the next layer. The weights and biases are usually initialized at the beginning of training. The result of the weighting and biasing is often routed through what is known as an activation function (for example sigmoid or tanh) before it is forwarded to the neurons of the next layer.

The weights and biases are adapted during the training process such that the end result corresponds to the requirements as precisely as possible.

The neural network of the first generator unit and the neural network of the second generator unit each at least partially have the same edge weights, and the neural network of the first discriminator unit and the neural network of the second discriminator unit each at least partially have the same edge weights.

The neural network of the first generator unit and the neural network of the second generator unit, or the neural network of the first discriminator unit and the neural network of the second discriminator unit, in particular have at least partially identical edge weights at points of the neural network that correspond to one another, that is to say points that for example have the same structure and/or the nodes of which correspond to one another semantically.

The edge weights of the neural networks are in particular at least partially identical when at least 90% of the edge weights are identical or particularly preferably 100% of the edge weights are identical.

A second aspect of the invention relates to a method for training the device according to one of claim 2, 3 or 4.

One step of the method is that of providing a training data pair, consisting of a training image and a first training top view. The training data pair is in this case selected such that the first training top view arises, taking into consideration the relevant view information from the training image.

A further step of the method is that of extracting the second view information from the training image by way of the coding unit, and extracting the view-independent content information from the training image by way of the coding unit.

A further step of the method is that of generating the first top view on the basis of the first view information and the view-independent content information by way of the first generator unit.

A further step of the method is that of deciding, by way of the first discriminator unit, whether the first top view has been generated by the first generator unit, or whether the first top view has been generated by a camera the optical axis of which is substantially orthogonal to a plane that is spanned by the vehicle longitudinal direction and the vehicle transverse direction.

A further step of the method is that of comparing the first top view with the first training top view, and adapting the coding unit and/or the first generator unit and/or the first discriminator unit on the basis of the comparison of the first top view with the first training top view.

The coding unit and the first generator unit are in particular adapted so as to increase the probability of the first discriminator unit classifying the first top view as an image from a camera the optical axis of which is substantially orthogonal to a plane that is spanned by the vehicle longitudinal direction and the vehicle transverse direction.

As an alternative or in addition, the discriminator unit is adapted so as to increase the probability of the first discriminator unit recognizing the first top view as an image generated by the first generator unit.

The core concept of the invention here is that the first discriminator unit, on the one hand, and the first generator unit and the coding unit, on the other hand, are trained simultaneously in terms of achieving competing goals. This leads to the quality of the first top view generated by the first generator unit increasing and this becoming increasingly difficult to distinguish from an actual camera image.

In one advantageous embodiment, the method comprises the step of adapting at least two of the following units on the basis of the comparison of the first top view with the first training top view: coding unit, first generator unit, first discriminator unit.

Adapting the coding unit, the first generator unit and/or the first discriminator unit means, in the event that these units each comprise a neural network, adapting the edge weights of the neural networks.

Adapting the edge weights causes the neural network to "learn".

The learning may for example work as follows: After the network structure has been constructed, each neuron receives a random starting weight. The input data are then entered into the network, and each neuron weights the input signals with its weight and forwards the result to the neurons of the next layer. The overall result is then computed at the output layer—and this will generally have little to do with the known actual result, since all the neurons actually have a random starting weight. However, it is possible to compute the size of the error and the contribution that each neuron made to this error, and then to change the weight of each neuron a small amount in the direction that minimizes the error. This is followed by the next pass, another measurement of the error and an adaptation of the weights, and so on. A neural network thus "learns" increasingly better to conclude as to the known output data from the input data.

In detail, the input data are fed in on one side of the neural network. In this case, each input signal is distributed to each individual neuron of the first layer. Each neuron then weights the incoming signal with an input-specific weight (that has been randomly allocated at the beginning), adds what is known as a neuron-specific bias term and sums all of the input data weighted in this way to form the output of this one neuron.

The output is in this case often also routed through a non-linear activation function, in order for example to force a particular value range of the output. The output of each neuron is then forwarded as input to all neurons of the following layer. This process continues until reaching the output layer that delivers the result of all computations.

Up to this point, the artificial neural network has not yet learned anything. Since all of the weightings are selected randomly within a predefined value range when a neural network is initialized, the result will be a purely random value. The variant most used at present to train a network is what is known as supervised learning, i.e. learning on the basis of examples.

An example in this case means a combination of real input/output data pairs. These examples are used in the course of training artificial neural networks in order to set all weights and bias terms in an optimum manner, such that the network is able to compute the correct result for all input data and also for as yet unseen new input data at the end of training.

In this case, the as yet untrained neural network calculates a respective result for a set of input data (also called features). This result is then compared with the known results of the example dataset (also called targets or labels), and the size of the deviation or the error is computed. In order to be able to simultaneously depict both positive and negative deviations, use is made for example of the average of the squared deviation or another error function.

The actual "learning" then begins: The measured error is backpropagated into the artificial neural network, and each weight and each bias term is adapted a small amount in the direction that makes the error smaller. The size of this adaptation is computed firstly using the contribution that a particular neuron weight made to the result, and secondly using what is known as the learning rate, which is one of the most important setting variables of neural networks.

Common learning rates are for example 0.001 or 0.01, that is to say only one hundredth to one thousandth of the calculated error is corrected per pass. If the adaptation per pass is too great, it may be the case that the minimum of the error curve is distorted and the deviations become increasingly large instead of smaller. The learning rate is therefore sometimes made increasingly small during training in order to better determine the minimum of the error function.

Another possible problem are error functions with local minima in which the neural network remains "stuck" and therefore does not find the actual minimum. The direction of the correction is calculated by deriving the respective functions, the negative value of which specifies the direction in which the error function is minimized. Minimizing the selected error function is the goal of training or learning.

After all of the weights have been adapted, there is another pass of all of the input data and another measurement of the error and this error is backpropagated in order to adapt the weights again. A complete pass of all of the input data is in this case respectively referred to as an epoch. The number of training epochs is likewise an important hyperparameter for training neural networks. In this case, the input data may also be classified into groups of equal size depending on the size of the dataset, and the training may in each case be performed batchwise.

This may for example be expedient in order to train an artificial neural network more quickly or to comply with limitations of the computing capacity of the executing computer. When dividing into batches, a normal distribution of the values within each batch in comparison with the entire dataset is important. When all of the batches have run through the neural network once, an epoch is complete.

The more examples an artificial neural network receives for training and the more often it has seen these, the smaller the error in the results becomes. The error curve moving towards and touching the 100% line is in this case referred to as convergence, and the profile of the error curve is observed during training in order to potentially stop the training and to be able to make adjustments to the hyperparameters. However, a small error does not always mean a good general performance of the neural network.

This is because, when it has seen all known data very often during training, it may be the case that the artificial neural network learns these data more by heart rather than learning an abstract concept. This problem is also referred to as overfitting. Since neural networks may also replicate highly complex functions, there is the risk that they at some point found the perfect function for each known data point, but this function does not work well for new data.

In order to ensure that a neural network is able to abstract from known example data and also deliver correct results for as yet unlearned input data, the example data are classified prior to training into training data, test data and blind test data, for example at a ratio of 70/20/10.

Only the training data are then used during training, and the error rate is measured respectively both for the training data and for the test data. The measured error in the test data is however not fed back into the artificial neural network. The neural network is then improved through adaptation of all variables so as to achieve maximum performance in relation to training and test data. This "tuning" of neural networks forms part of the core activities of artificial intelligence engineers.

Only when the network has presumably been fully trained are the blind test data used. If the artificial neural network also performs well in the blind test, there is a high probability that it has learned an abstract concept well.

A large amount of example data is accordingly required for the described supervised learning. A large amount means here for example one million examples. Although some artificial neural networks already achieve remarkable results with smaller datasets, the more data available, the better. For the classification of images, for example, usable results are achieved starting from around 1000 example images per class. A whole research branch of artificial intelligence also deals with what are known as one-shot learning methods, that is to say learning based on very few or just one example.

The supervised learning itself may also be further classified into different data usage and forwarding methods within artificial neural networks: In what are known as recurring neural networks, for example, the result of the previous input data is incorporated into the computing of the current output, such that for example time sequences and texts are able to be analyzed and processed, including for example in the case of long short-term memory (LSTM) networks and sequence to sequence networks that are used for example for voice recognition and to translate texts. What are known as convolutional neural networks (CNN) are used for image processing, these sampling images with a matrix and performing further abstraction from deeper layers (points, lines, etc.) in each layer to form higher concepts (a face, a house, etc.).

A third aspect of the invention is a method for training the device according to one of claim 2, 3 or 4.

One step of the method is that of providing a training data pair consisting of training view information and a second training top view.

A further step of the method is that of generating the second top view on the basis of the training view information and the noise information by way of the second generator unit.

In comparison with the training method according to the second aspect of the invention, the training method according to the third aspect of the invention has the advantage that what is known as overfitting of the generator and discriminator units to the training data is prevented, since in this case the generator and discriminator units have to deal with input information that is unexpected because it is randomly generated.

A further step of the method is that of deciding, by way of the second discriminator unit, whether the second top view has been generated by the second generator unit or whether the second top view has been generated by a camera the optical axis of which is substantially orthogonal to a plane that is spanned by the vehicle longitudinal direction and the vehicle transverse direction.

A further step of the method is that of comparing the second top view with the second training top view and adapting the second generator unit and/or the second discriminator unit on the basis of the comparison of the second top view with the training top view.

The second generator unit is in particular adapted so as to increase the probability of the second discriminator unit classifying the second top view as an image from a camera the optical axis of which is substantially orthogonal to a plane that is spanned by the vehicle longitudinal direction and the vehicle transverse direction.

As an alternative or in addition, the second discriminator unit is adapted so as to increase the probability of the second discriminator unit recognizing the second top view as an image generated by the second generator unit.

The method in particular comprises the step of adapting the second generator unit and the second discriminator unit on the basis of the comparison of the second top view with the training top view.

Adapting the second generator unit and/or the second discriminator unit means, in the event that these units each comprise a neural network, adapting the edge weights of the neural networks.

A fourth aspect of the invention relates to a method for training the device according to one of claims 2, 3 or 4.

One step of the method is that of training the device by carrying out the method according to the second aspect of the invention at least once.

A further step of the method is that of training the device by carrying out the method according to the third aspect of the invention at least once.

In this case, the step of training the device by carrying out the method according to the third aspect of the invention at least once is in particular performed only after the step of training the device by carrying out the method according to the second aspect of the invention at least once.

The invention is described below on the basis of an exemplary embodiment with reference to the accompanying drawings, in which:

FIG. 1 shows one exemplary embodiment of the device according to the invention,

FIG. 2 shows one exemplary embodiment of a motor vehicle having multiple cameras, and FIG. 3 shows one exemplary embodiment of a neural network.

FIG. 1 shows a device for generating a first top view d1 of a motor vehicle, dependent on first view information s1, from at least one image b from at least one camera k1, k2, k3, k4 the optical axis of which is substantially parallel to a plane that is spanned by the vehicle longitudinal direction and the vehicle transverse direction.

The device is in this case designed to receive the at least one image b from the camera k1, k2, k3, k4, to extract second view information s2 from the image b by way of a coding unit E, and to extract view-independent content information z from the image b by way of the coding unit E.

The device is furthermore designed to generate the first top view d1 on the basis of the first view information s1 and the view-independent content information z by way of a first generator unit G1.

The device furthermore comprises a first discriminator unit D1 that is designed to receive the top view d1 generated by the first generator unit G1, a second generator unit G2 that is designed to generate a second top view d2 from third view information s3 and noise information r, and a second discriminator unit D2 that is designed to receive the top view d2 generated by the second generator unit G2.

The first discriminator unit D1 and the second discriminator unit D2 are each designed to decide whether the first top view d1 or the second top view d2 have been generated by the first generator unit G1 or the second generator unit G2, respectively, or whether the first top view d1 or the second top view d2 have been generated by a camera the optical axis of which is substantially orthogonal to a plane that is spanned by the vehicle longitudinal direction and the vehicle transverse direction.

The first generator unit G1, the second generator unit G2, the first discriminator unit D1 and the second discriminator unit D2 each comprise a neural network.

The neural network of the first generator unit G1 and the neural network of the second generator unit G2 each at least partially have the same edge weights, and the neural network of the first discriminator unit D1 and the neural network of the second discriminator unit D2 likewise each at least partially have the same edge weights.

This device is able to be trained using the methods according to the second, third and fourth aspect of the invention.

The method according to the second aspect of the invention comprises in particular the following steps:
providing a training data pair, consisting of a training image b and a first training top view td1,
extracting the second view information s2 from the training image b by way of the coding unit E,
extracting the view-independent content information z from the training image b by way of the coding unit E,
generating the first top view d1 on the basis of the first view information s1 and the view-independent content information z by way of the first generator unit G1,
deciding, by way of the first discriminator unit D1, whether the first top view s1 has been generated by the first generator unit G1, or whether the first top view s1 has been generated by a camera the optical axis of which is substantially orthogonal to a plane that is spanned by the vehicle longitudinal direction and the vehicle transverse direction,
comparing the first top view s1 with the first training top view td1, and
adapting the coding unit E and the first generator unit G1 and the first discriminator unit D1 on the basis of the comparison of the first top view d1 with the first training top view td1.

The method according to the second aspect of the invention comprises in particular the following steps:
providing a training data pair consisting of training view information s3 and a second training top view td2,
generating the second top view d2 on the basis of the training view information s3 and the noise information r by way of the second generator unit G2,
deciding, by way of the second discriminator unit D2, whether the second top view s2 has been generated by the second generator unit G2 or whether the second top view s2 has been generated by a camera the optical axis of which is substantially orthogonal to a plane that is spanned by the vehicle longitudinal direction and the vehicle transverse direction,
comparing the second top view d2 with the second training top view td2, and
adapting the second generator unit G2 and the second discriminator unit D2 on the basis of the comparison of the second top view d2 with the training top view td2.

The method for training the device according to the fourth aspect of the invention advantageously links the two training methods according to the second aspect of the invention and the third aspect of the invention.

This effect in particular results from the fact that the first generator unit G1 and the second generator unit G2, and also the first discriminator unit D1 and the second discriminator unit D2, are connected to one another by sharing common edge weights.

In one preferred embodiment, the training method according to the second aspect of the invention is in this case first carried out to a greater extent, before the training method according to the third aspect of the invention is carried out to a greater extent at a later time.

FIG. 2 shows one exemplary embodiment of a motor vehicle having multiple cameras k1, k2, k3, k4 that are each arranged on the motor vehicle such that their optical axes are substantially parallel to a plane that is spanned by the vehicle longitudinal direction and the vehicle transverse direction.

FIG. 3 shows one exemplary embodiment of a neural network that is constructed from four layers A, B, C, D of neurons A1-A4, B1-B5, C1-C5, D1-D3.

Some of the neurons are connected to one another by edges. As already explained, each of these edges is assigned an edge weight, not illustrated in FIG. 3.

The invention claimed is:

1. A device for generating a first top view of a motor vehicle, dependent on first view information, from at least one image from at least one camera, comprising:
a coding unit and a first generator unit of the device,
wherein the device is operatively configured to:
receive the at least one image from the at least one camera, wherein the at least one camera has an optical axis substantially parallel to a plane that is spanned by a vehicle longitudinal direction and a vehicle transverse direction,
extract second view information from the image by way of the coding unit of the device,
extract view-independent content information from the image by way of the coding unit, and
generate, by way of the first generator unit of the device, the first top view of the motor vehicle based on the first view information and the view-independent content information,
wherein the device further comprises:
a first discriminator unit that is configured to receive the top view generated by the first generator unit,
a second generator unit that is configured to generate a second top view from third view information and noise information, and
a second discriminator unit that is configured to receive the top view generated by the second generator unit.

2. The device according to claim 1, wherein
the first discriminator unit and the second discriminator unit are each configured to decide whether the first top view or the second top view have been generated by the first generator unit or second generator unit, respectively, or whether the first top view or the second top view have been generated by the camera whose optical axis is substantially orthogonal to a plane that is spanned by the vehicle longitudinal direction and the vehicle transverse direction.

3. The device according to claim 1, wherein the first generator unit, the second generator unit, the first discriminator unit, and the second discriminator unit each comprise a neural network, and the neural network of the first generator unit and the neural network of the second generator unit each at least partially have same edge weights, and the neural network of the first discriminator unit and the neural network of the second discriminator unit each at least partially have same edge weights.

4. A method for training a device for generating a first top view of a motor vehicle, dependent on first view information, from at least one image from at least one camera, wherein the device has a coding unit, first and second generator units and first and second discriminator units, and is operatively configured to:

receive the at least one image from the at least one camera, wherein the at least one camera has an optical axis substantially parallel to a plane that is spanned by a vehicle longitudinal direction and a vehicle transverse direction, extract second view information from the image by way of the coding unit, extract view-independent content information from the image by way of the coding unit, generate, by way of the first generator unit of the device, the first top view of the motor vehicle based on the first view information and the view-independent content information, receive, by the first discriminator unit, the top view generated by the first generator unit, generate, by the second generator unit, a second top view from third view information and noise information, and receive, by the second discriminator unit, the top view generated by the second generator unit, wherein the training method comprises the steps of:
(a) providing a training data pair comprising a training image and a first training top view,
(b) extracting the second view information from the training image by way of the coding unit,
(c) extracting the view-independent content information from the training image by way of the coding unit,
(d) generating the first top view on the basis of the first view information and the view-independent content information by way of the first generator unit,
(e) deciding, by way of the first discriminator unit, whether the first top view has been generated by the first generator unit, or whether the first top view has been generated by the camera whose optical axis is substantially orthogonal to a plane that is spanned by the vehicle longitudinal direction and the vehicle transverse direction,
(f) comparing the first top view with the first training top view, and
(g) adapting the coding unit, the first generator unit, and/or the first discriminator unit on the basis of the comparison of the first top view with the first training top view.

5. The method according to claim 4, wherein the method further comprises the step of:

adapting at least two of the following units on the basis of the comparison of the first top view with the first training top view:
the coding unit,
the first generator unit, or
the first discriminator unit.

6. The method according to claim 4, wherein the device is trained by carrying out the steps (a) through (g) at least once, and carrying out the steps of:
(a1) providing a training data pair comprising training view information and a second training top view,
(b1) generating the second top view on the basis of the training view information and the noise information by way of the second generator unit,
(c1) deciding, by way of the second discriminator unit, whether the second top view has been generated by the second generator unit or whether the second top view has been generated by the camera the optical axis of which is substantially orthogonal to a plane that is spanned by the vehicle longitudinal direction and the vehicle transverse direction,
(d1) comparing the second top view with the second training top view, and
(e1) adapting the second generator unit and/or the second discriminator unit on the basis of the comparison of the second top view with the training top view.

7. The method according to claim 6, wherein the steps (a1)
(e1) are performed only after the steps of (a) - (g) have been carried out of least once.

8. A method for training a device for generating a first top view of a motor vehicle, dependent on first view information, from at least one image from at least one camera, wherein the device has a coding unit, first and second generator units and first and second discriminator units, and is operatively configured to:

receive the at least one image from the at least one camera, wherein the at least one camera has an optical axis substantially parallel to a plane that is spanned by a vehicle longitudinal direction and a vehicle transverse direction, extract second view information from the image by way of the coding unit, extract view-independent content information from the image by way of the coding unit, generate, by way of the first generator unit of the device, the first top view of the motor vehicle based on the first view information and the view-independent content information, receive, by the first discriminator unit, the top view generated by the first generator unit, generate, by the second generator unit, a second top view from third view information and noise information, and receive, by the second discriminator unit, the top view generated by the second generator unit, wherein the training method comprises the steps of:
(a1) providing a training data pair comprising training view information and a second training top view,
(b1) generating the second top view on the basis of the training view information and the noise information by way of the second generator unit,
(c1) deciding, by way of the second discriminator unit, whether the second top view has been generated by the second generator unit or whether the second top view has been generated by the camera whose optical axis is substantially orthogonal to a plane that is spanned by the vehicle longitudinal direction and the vehicle transverse direction, (d1) comparing the second top view with the second training top view, and (e1) adapting the second generator unit and/or the second discriminator unit on the basis of the comparison of the second top view with the training top view.

9. The method according to claim 8, wherein the method further comprises the step of:

adapting the second generator unit and the second discriminator unit on the basis of the comparison of the second top view with the training top view.

* * * * *